(12) United States Patent
Robotka (10) Patent No.: US 8,374,325 B2
(45) Date of Patent: Feb. 12, 2013

(54) BILINGUAL COMMUNICATION SYSTEM

(75) Inventor: Shawn N Robotka, Blaine, MN (US)

(73) Assignee: Shawn N. Robotka, Eau Claire, WI (US)

( * ) Notice: Subject to any disclaimer, the term of this patent is extended or adjusted under 35 U.S.C. 154(b) by 1059 days.

(21) Appl. No.: 12/283,799

(22) Filed: Sep. 16, 2008

(65) Prior Publication Data

US 2010/0066803 A1    Mar. 18, 2010

(51) Int. Cl.
*H04M 3/42* (2006.01)

(52) U.S. Cl. .......... 379/201.01; 348/14.01; 370/352; 379/88.13; 379/88.17; 455/414.1; 704/9; 704/277; 709/203; 709/219

(58) Field of Classification Search .......... 370/259–271, 370/351–356; 379/67.1–88.28, 201.01, 265.01–266.1; 704/270–278; 709/201–207, 217–248; 348/14.01–14.16; 455/412.1–420, 426.1, 455/426.2, 550.1–560, 575.1–575.9, 90.1–90.3
See application file for complete search history.

(56) References Cited

U.S. PATENT DOCUMENTS

| | | | | |
|---|---|---|---|---|
| 5,392,343 | A * | 2/1995 | Davitt et al. | 379/265.12 |
| 6,272,633 | B1 * | 8/2001 | Duke et al. | 713/171 |
| 6,618,704 | B2 * | 9/2003 | Kanevsky et al. | 704/271 |
| 6,690,932 | B1 * | 2/2004 | Barnier et al. | 455/414.1 |
| 7,130,792 | B2 * | 10/2006 | Tokieda et al. | 704/7 |
| 7,142,642 | B2 | 11/2006 | McClelland et al. | |
| 7,315,612 | B2 * | 1/2008 | McClelland | 379/52 |
| 7,333,507 | B2 * | 2/2008 | Bravin et al. | 370/466 |
| 7,376,415 | B2 * | 5/2008 | Surette | 455/418 |
| 2002/0022954 | A1 * | 2/2002 | Shimohata et al. | 704/3 |
| 2002/0069067 | A1 * | 6/2002 | Klinefelter et al. | 704/270.1 |
| 2003/0125927 | A1 * | 7/2003 | Seme | 704/3 |
| 2003/0223455 | A1 | 12/2003 | Rashdan | |
| 2005/0086699 | A1 * | 4/2005 | Hahn et al. | 725/106 |
| 2005/0177409 | A1 * | 8/2005 | Barni | 705/9 |
| 2005/0216252 | A1 * | 9/2005 | Schoenbach et al. | 704/3 |
| 2006/0077972 | A1 * | 4/2006 | Lee | 370/356 |
| 2006/0166715 | A1 * | 7/2006 | Van Engelen et al. | 455/575.2 |
| 2007/0239625 | A1 * | 10/2007 | Sterns et al. | 705/400 |
| 2008/0025493 | A1 * | 1/2008 | Paras et al. | 379/265.12 |
| 2008/0086681 | A1 * | 4/2008 | Sterns | 715/236 |
| 2008/0162110 | A1 * | 7/2008 | Mergen et al. | 704/2 |
| 2008/0195482 | A1 * | 8/2008 | Sailer | 705/14 |
| 2008/0263132 | A1 * | 10/2008 | Saintloth | 709/203 |
| 2009/0265175 | A1 * | 10/2009 | Fang | 704/277 |
| 2011/0066422 | A1 * | 3/2011 | Hybschmann et al. | 704/3 |

\* cited by examiner

*Primary Examiner* — Hemant Patel
(74) *Attorney, Agent, or Firm* — Fish & Richardson P.C.

(57) ABSTRACT

Embodiments of the present invention include a system, apparatus and method for addressing the need of remotely providing live interpretation to location-specific sites in a timely manner. The system for bilingual communication includes a means to allow a first communicating party and a second communicating party to electronically communicate where the first party and second party communicate in different languages for a group consisting of all spoken languages and sign language. Either or both parties may be more than one person. Communication is made in at least a first location-specific site and is made in a timely manner through a remote third party live interpreter.

14 Claims, 5 Drawing Sheets

BILINGUAL COMMUNICATION SYSTEM

FIELD OF THE INVENTION

This invention relates to a system for bilingual electronic communication, an apparatus used in such system and a method of accomplishing bilingual communication.

BACKGROUND OF THE INVENTION

Bilingual communication has become an increasingly difficult problem in a number of areas, such as, for example, health care, police and fire departments, and other governmental agencies.

There is a growing awareness of a need to remotely bring interpreting services into situations where clear understanding is critical during communication between at least two people communicating in different languages. Common venues involve healthcare, police and fire, courts, global business and military encounters.

In the United States, the situation has become particularly needful in an increasing number of areas of public service. Laws and resulting legal liabilities combine with a growing immigration of people not fluent in English to create situations where public services are mandated to provide what they often are unable to do. As an example, the Americans with Disabilities Act (ADA) requires healthcare facilities to make "reasonable accommodation" for the disabled. However, many healthcare facilities have little or no onsite personnel able to assist hearing impaired in location-specific sites such as emergency rooms in a timely manner. In addition, other location-specific sites involving police and firefighters, in a similar manner, are often unable to provide clear communication between hearing-impaired people needing services and those able to offer services.

This situation also occurs with people that are able to hear well but are not fluent in English. Currently in the United States, there are regions with large numbers of people who are not fluent in English but are fluent in other languages such as, for example, Spanish, Laotian, and Somali, to name a few.

In addition, privacy laws have placed an additional burden on clear communication through electronic means. In the United States, there are standards provided by government agencies defining minimal levels of security required to be privacy compliant. It is thus a matter of time before medical or other emergency, location-specific electronic communications will be legally required to comply with privacy mandates.

Present means to address the communication problem are inadequate. Conference call arrangements do not address the location-specific nature and short time intervals often necessary for clear communication to occur. Software programs and other artificial intelligence means have not evolved sufficiently to provide the necessary clear communication as needed at location-specific sites. Early teachings of the broad use of mobile devices with internet connections have not been enabling. Use of dedicated phone lines to call centers, and dedicated lines linking interpreters to sites requiring interpretation have not been sufficiently location independent or timely to address the need stated earlier. The presence of live interpreters provides clear communication but their availability is limited in location-specific sites, particularly where short time intervals exist to provide such clear communication. With life-and-death decisions often needing to be made in minutes rather than hours, time is often inadequate to obtain the presence of live interpreters as location-specific sites when appropriate.

Thus there is still a need for a system that provides clear communication in a time-sensitive manner at location-specific sites between people able to communicate fluently only in different languages.

SUMMARY OF THE INVENTION

I have invented a system, apparatus and method for addressing the need to remotely provide live interpretation to location-specific sites in a timely manner. The system for bilingual communication includes a means to allow a first communicating party and a second communicating party to electronically communicate where the first party and second party communicate in different languages for a group consisting of all spoken languages and sign language. Either or both parties may be more than one person. Communication is made in at least a first location-specific site and is made in a timely manner through a remote third party live interpreter.

In addition, I have invented a bilingual communication apparatus that includes a supporting structure having a top and a bottom, a communication means at least partially enclosed by the structure, a visual communication means and an audio communication means. The communication means is configured to be able to allow at least one communicating party to electronically connect with a networking means that is configured to be able to communicatively connect to at least two other parties to perform bilingual communication in a timely manner between a first party and a second party through a remote third live interpreting party. The first party and second party are (1) in a first location-specific site and (2) communicate in a different language from a group consisting of all spoken languages and sign language, and the third party is able to communicate in both languages. The visual communication means is able to convey at least a language selection to the networking means and sign language to and from a party. The audio communication means is able to convey audio communication to and from a communicating party. In addition, the apparatus is able to be moved from the first location-specific site while electronic communication is continued among parties.

I have also invented a method of bilingual communication including the following steps. One step is to provide a means to allow a first communicating party and a second communicating party to electronically communicate from a first location-specific site in a timely manner through a remote third party interpreter, where first party and second party communicate in different languages for a group consisting of all spoken languages and sign language The means used by the first and second party is able to be moved to different locations during communication and the first party and the second party may each include more than one persons. Another step is selecting the language that is in need of interpretation. Another step is connecting with the third party in a timely manner. Still another step is the connecting of a second party to the third party. Another step is beginning a two-way communication between first party and second party in real time with each party receiving communication in his or her own language from the remote third party.

The various aspects of my invention offer at least five important benefits to those communities seeking clear communication in a timely manner between parties communicating in different languages. First, my invention enables a party in a location-specific situation to connect with a third party live interpreter in a timely manner where minutes, and sometimes seconds, may make a difference between life and death or minor injury and major injury. Second, the first party and the second party may move to a different location while communicating such as, for example, for further treatment or additional testing. Third, the third party may be able to move about to different locations while communicating rather than being restricted to a stationary communication device. Fourth, all electronic communications may be secure from undesirable fourth party intelligent interception to comply with either privacy desires or requirements. Fifth, communication is able to be in real-time between a first party and a second party, as though they were having a conversation with each other.

As used herein:

"Bilingual communication" means communication by electronic means between two parties communicating in different languages from a group consisting of all spoken languages and sign language.

"First communicating party" means a party seeking to communicate with a second party by initiating an electronic connection with a remote third party interpreter.

"Second communicating party" means a party that a first party is seeking communication with through electronic communication with a third party.

"Location-specific site" means the site of a critical activity, of often short notice, where initial movement to another location is restricted for reasons other than communication such as, for example, an emergency room, the scene of a fire or accident where injuries have occurred, location of a first-responder incident, or a relatively spontaneous business interaction.

"Timely manner" means communication between first and second party through a remote interpreter that is able to begin in less than 1 minute.

"Remote third party interpreter" means an interpreter who is a live person located in at lease a different room from the first and second parties such that the third party must be connected to both the first party and second party by electronic communication means.

"Communicate in different languages" means communication where understanding is comparable to that of fluent communication.

"On-demand" means that first party is able to electronically identify an available remote third party interpreter in less than 5 seconds.

"Real time" means able to transmit in one language and receive in another language with most of the delay of time being what it takes to paraphrase as necessary, where communication delay is able to be less than 10 seconds.

"Electronic communication means" means communication by internet protocol, satellite communication or radio frequency, or a combination thereof.

"Able to be moved to different locations" means the means for communicating to and from another party is portable, confined only by range of transmission and reception of a routing means.

"Municipality" means a collection of people with at least some self-governing capability in a larger political subdivision such as, for example, county, state or country.

"Securely communicate" means electronic transmissions encrypted with at least a 128 bit cipher key.

BRIEF DESCRIPTION OF THE DRAWINGS

One or more features of embodiments of the invention are described in the accompanying drawings. The drawings are briefly described below.

DETAILED DESCRIPTION OF SOME EMBODIMENTS OF THE INVENTION

I have invented a system, apparatus and method for allowing people in location-specific sites to communicate through remote live interpreters in a timely manner. This has previously not been possible with the teachings known to the public or the systems used by the public. A brief discussion of (1) the recent electronic communication landscape, (2) the competitive interpretive landscape, and (3) the liability landscape will help put the features of my invention in perspective.

The Recent Electronic Communication Landscape

Many people use the terms "Internet" and "World Wide Web" (aka. the Web) interchangeably, but in fact the two terms are not synonymous. The Internet and the Web are two separate but related things.

The Internet is a massive network of networks, a networking infrastructure. It connects millions of computers together globally, forming a network in which any computer can communicate with any other computer as long as they are both connected to the Internet. Information that travels over the Internet does so via a variety of languages known as protocols.

The World Wide Web, or simply Web, is a way of accessing information over the medium of the Internet. It is an information-sharing model that is built on top of the Internet. The Web uses the HyperText Transfer Protocol (HTTP), only one of the languages spoken over the Internet, to transmit data. Web services, that use HTTP to allow applications to communicate in order to exchange business logic, use the Web to share information. The Web also utilizes browsers, such as INTENET EXPLORER® or FIREFOX®, to access Web documents called Web pages that are linked to each other via hyperlinks. Web documents also contain graphics, sounds, text and video.

The Web is just one of the ways that information can be disseminated over the Internet. The Internet, not the Web, is also used for e-mail, which relies on Simple Mail Transfer Protocol (SMTP), Usenet news groups (a worldwide bulletin board system that can be accessed through the internet or other online services), instant messaging or IM (a type of communications service that enables you to create a kind of private text-based, and recently audio-video based, chat room with another individual in order to communicate in real time over the Internet), File Transfer Protocol or FTP (the protocol for exchanging files over the Internet that works like HTTP and SMTP) and HyperText Markup Language or HTML (which covers how Web pages are formatted and displayed), to name but a few. So the Web is just a portion of the Internet, albeit a large portion, but the two terms are not synonymous and should not be confused.

In recent years other protocols have been developed to use the new technologies that have been developed for the internet. FTP uses the Internet's Transmission Control Protocol/Internet Protocol or TCP/IP to enable data transfer. TCP is one of the main protocols in TCP/IP networks, the suite of communications protocols used to connect hosts on the Internet. Whereas IP deals only with packet formatting and addressing schemes, TCP enables two hosts to establish a connection and exchange streams of data. TCP guarantees delivery of data and also guarantees that packets will be delivered in the same order in which they were sent. TCP/IP establishes a connection between two hosts so that they can send messages back and forth for a period of time.

Integrated Services Digital Network or ISDN is an international communications standard for sending voice, video, and data over digital telephone lines or normal telephone wires. ISDN supports data transfer rates of 64 kilobits per second (Kbps). The original version of ISDN employs baseband transmission that allows only one signal at a time and is used for most communications between computers, including the majority of local-area networks. Another version, called B-ISDN, uses broadband transmission, is able to support transmission rates of 1.5 megabits per second (Mbps), requires fiber optic cables, and is not widely available.

T-1 Carrier, released to the public in 1999, is a dedicated phone connection supporting data rates of 1.544 Mbps. A T-1 line actually consists of 24 individual channels, each of which supports 64 Kbps. Each 64 Kbps channel can be configured to carry voice or data traffic. While in 2000, the cost of a T1 line was $1200-$1500 and anywhere from $850 to $1000 per month to transmit at 1.2 Mbps, today the costs are typically $800 and $500 per month and the transmission rates are as high as 3.0 Mbps. Most telephone companies allow you to buy just some of these individual channels, known as fractional T-1 access. T-1 lines are a popular leased line option for businesses connecting to the Internet and for Internet Service Providers (ISPs) connecting to the Internet backbone. The Internet backbone itself consists of faster T-3 connections that support transmissions of about 43 Mbps and consist of 672 individual channels, each of which supports 64 Kbps. In recent years there has been a transformation from landlines to wireless. By 1990, cell phones were replacing wired phones. Then video capability on cell phones was introduced in 2004. Today, cell phones with video recording and sending capability are common.

WI-FI®, a popular wireless networking technology that uses radio waves to provide wireless high-speed Internet and network connections, is a registered trademark owned by Wi-Fi Alliance. WI-FI® works with no physical wired connection between sender and receiver by using radio frequency (RF) technology, a frequency within the electromagnetic spectrum associated with radio wave propagation. When an RF current is supplied to an antenna, an electromagnetic field is created that then is able to propagate through space. The cornerstone of any wireless network is an access point (AP). The primary job of an access point is to broadcast a wireless signal that computers can detect and "tune" into. In order to connect to an access point and join a wireless network, computers and devices must be equipped with wireless network adapters. In order to connect to an access point and join a wireless network, computers must be equipped with wireless network adapters. These are often built right into the computer, but if not, just about any computer or notebook can be made wireless-capable through the use of an add-on adapter plugged into an empty expansion slot, USB port, or in the case of notebooks, a PC Card slot WI-FI® is supported by many applications and devices including video game consoles, home networks, PDAs, mobile phones, major operating systems, and other types of consumer electronics. Any products that are tested and approved as WI-FI® Certified are certified as interoperable with each other, even if they are from different manufacturers. For example, a user with a WI-FI® Certified product can use any brand of access point with any other brand of client hardware that also is also WI-FI® Certified. Products that pass this certification are required to carry an identifying seal on their packaging that states WI-FI® Certified and indicates the radio frequency band used (2.5 GHz for 802.11b, 802.11g, or 802.11n, and 5 GHz for 802.11a).

Wireless broadband was not openly released to the public until 2000 however it was not widely available until 2003. Today the most common wireless technology standards include the following:

802.11b: The first widely used wireless networking technology, known as 802.11b (more commonly called WI-FI®), first debuted almost a decade ago, but is still in use. This operates at a speed of 11 Mbps. To give a comparison of cost, in 2000, an affluent household with bandwidth of about 1 Mbps could download an 8-song MP3 album (25 megabytes) in about 2 minutes, to a hard disk costing about $10 per gigabyte.

802.11g: In 2003, a follow-on version called 802.11g appeared offering greater performance (that is, speed and range) and remains today's most common wireless networking technology. This operates at a speed of 54 Mbps. With this technology, today's storage costs have been reduced to 25 cents per gigabyte (40 times less than in 2000), so it's not surprising that download speeds of 40 Mbps are already desired by affluent households.

802.11n: Another improved standard called 802.11n is currently under development and is scheduled to be complete in 2009. But even though the 802.11n standard has yet to be finalized, one can still buy products based on the draft 802.11n standard, which will be able to be upgrade later to the final standard. This operating speed is 450 Mbps. By 2015 with this technology, storage is expected to cost a penny per gigabyte. A 25 gigabyte movie will cost the same to store on a hard disk as a 25 megabyte 8-song album did in 2000.

Today, a major challenge with WI-FI® is the signal degradation. In the various wireless standards, the maximum transmission rate listed and the actual transmission rate achieved is vastly different because, in part, from transmission and connection resistance. Fiber optic lines permit faster transmission rates than copper but it has taken a long time and a great deal of investment to build the infrastructure to practically make use of that difference. Between 2000 and 2001 when WI-FI® B was available with an official rate of 11 Mbps. Similarly, between 2001 and 2003 when WI-FI® G was introduced, the official rate was 54 Mbps. Today with WI-FI® N, the official rate is 300 to 450 Mbps. Use of MIMC technology pushes the envelope to a possible 600 Mbps. However, the actual rates may be much less depending on such factors as, for example, the distance from the access point. As you can see when you look at these numbers, you get a huge bottle neck when you go from a land line to a wireless. Until 2007, the ability to do so wirelessly in real-time was not possible, especially with video that requires transmission rates of sometimes over 100 Mbps.

Another major challenge with WI-FI® is security. All anyone needs to detect a wireless network within a nearby range is a wireless-equipped computer in the same way that all one needs to pick-up a local radio station is a radio. However, by turning on a wireless network's encryption feature, one can scramble the data and control access to the network. Wireless network hardware supports several standard encryption schemes, but the most common are Wired Equivalent Privacy (WEP), WI-FI® Protected Access (WPA), and WI-FI® Protected Access 2 (WPA2). WEP is the oldest and least secure method and should be avoided. WPA and WPA2 are good choices, but provide better protection when you use longer and more complex passwords. All devices on a wireless network must use the same kind of encryption and be configured with the same password.

Virtual Private Network or VPN, released to the public in 2002, is a network that is constructed by using public infrastructure to connect nodes. For example, there are a number of systems that enable you to create networks using the Internet as the medium for transporting data. These systems use encryption and other security mechanisms to ensure that only authorized users can access the network and that the data cannot be intercepted.

Voice Over Internet Protocol or VOIP, released to the public in 2002, is a category of hardware and software that enables people to use the Internet as the transmission medium for telephone calls by sending voice data in packets using IP rather than by traditional circuit transmissions of the Public Switched Telephone Network or PSTN. One advantage of VOIP is that the telephone calls over the Internet do not incur a surcharge beyond what the user is paying for Internet access, much in the same way that the user doesn't pay for sending individual e-mails over the Internet. In 2007, wireless voice or video over Internet or WVOIP, became possible. Development is still underway on the ability to transmit video over the PSTN. There are many Internet telephony applications available. Some, like CoolTalk and NETMEETING®, come bundled with popular Web browsers. Others are stand-alone products. VOIP also is referred to as Internet telephony, IP telephony, or Voice over the Internet (VOI)

BLUETOOTH® technology, released to the public in 200, is a short-range radio technology aimed at simplifying communications among Internet devices and between devices and the Internet. It also aims to simplify data synchronization between Internet devices and other computers. Products with BLUETOOTH® technology must be qualified and pass interoperability testing by the BLUETOOTH® Special Interest Group prior to release. Founding members of BLUETOOTH® technology include Ericsson, IBM, Intel, Nokia and Toshiba.

Becoming available in the United States in 2007, 3G technology is the latest in mobile communications. 3G stands for "third generation"—this makes analog cellular technology generation one and digital/PCS generation two. 3G technology is intended for the true multimedia cell phone, typically called smartphones, and features increased bandwidth and transfer rates to accommodate Web-based applications and phone-based audio and video files.

As is apparent from the above discussion, many aspects of communication technology have not been available until recently to make real-time video transmission to mobile devices possible.

The Competitive Interpretive Landscape

The need is broad for people in location-specific sites to communicate through remote live interpreters in a timely manner and includes such industries, for example, as health care, police and fire departments, the legal system, and executive travel. A great deal of grant money is available for systems that focus on the hearing impaired while little grant money is allocated for interpretation involving only spoken languages. Thus, several of the electronic interpreting systems in the marketplace offer services able to provide sign language interpretation in addition to audio interpretation. While Language Line Services focuses on oral languages, some of the companies offering interpreting services to hearing impaired include, for example, Cisco Systems, Inc. (Cisco), SLA for ASL, and Sorenson Communications (Sorenson). All of these have similar types of products; large based single units or integrated proprietary phone systems. In all of these cases the protection or specific of security is unknown.

In the years around 2000, many inventions were taught in patent applications that used the internet in imaginative ways but were not enabled because the technology did not exist to fulfill the dreams. U.S. Patent Pub, No. US 2002/0069067 (Klinefeltner), filed Oct. 25, 2001, was one such patent application. As shown above, the technology did not exist to accomplish what was taught, audio/video communication by cell phones with video displays and cameras between a first responder's device and a language interpreter to communicate with hearing impaired. However, the claims are of a system that is more limiting, an audio video conferencing system between a first party and an interpreter as is used by Cisco claims of the application describe systems similar to the audio video conference systems used by Cisco. In any case, the teachings are of system for two-way communication between a person's device and that of an interpreter.

Language Line Services is a multi language telephone interpreting service by AT&T that uses dedicates phone line to call centers located across the world. In a simple process, you call their 1-800 number and get and an auto attendant or scheduler that assist you in picking the language needed and then directs your call accordingly. All their services are threw the AT&T telecom network and utilize the phone as the comunication device.

Cisco offers a: proprietary stationary phone system to connect users with interpreters. Cisco has remarketed their audio video conferencing technology to the interpreting services arena. The technology has not changed nor does it differ from their basic audio video conferencing design. Cisco system is based on dedicated digital lines between point A and point B. The systems are easy to use and utilize a web base interface that allow the user to choose a requested language and then is routed accordingly to an available resource. Cisco's Teleconferencing is point to point and is a closed system between participants in the specific network. Its design is for Hospitals who have in house interpreting resources, and to share those resources with other hospitals within their network. It does not have the ability to reach beyond the group structure. Interpreting resources are limited to what each hospital has available at any given time regarding their interpreting employees.

SLA for ASL is a health care equipment company that markets systems of other companies such as teleconferencing systems by Cisco. The systems are large systems, big enough to be non-mobile, for the American Sign Language (ASL) market.

Sorenson, using large stationary units, is mainly an ASL relay provider only serving the specialty hearing-impaired market. Founded in 2000, it is a completely dedicated system that utilizes ASL interpreters as operators. The relay is video on one side and Audio on the other. The design is simple, a hearing-impaired individual call the Sorenson network and is put in a waiting query. When n ASL operator is available, a video connection is created and the operator communicates using sign language. Then the operator makes a call by request on behalf of the hearing-impaired individual and an audio connection is made. The operator then acts as a conduit utilizing video and sign language on one side of the call and audio on the other side of the call. The video side of the call is done on dedicated lines to support the video bandwidth. The audio is done on standard phone lines.

None of them are able to allow people in location-specific sites to communicate through remote live interpreters in a timely manner.

The Liability Landscape

In recent year the legal liability and corresponding self-regulation scene has become increasingly complex from two directions, adequate services to all individuals and privacy. Failure to satisfy each area brings increased legal liability to governmental units and industries, particularly those that provide health care, that interact frequently with other people not fluent in English.

In some respects the health care industry is leading self regulation effort. The Joint Commission on Accreditation of Healthcare Organizations (JCAHO) has revised its hospital standards. Recently it has disseminated its 2008 Hospital National Patient Safety Goals. The stated purpose of the se goals is to improve patient safety by focusing on problems in health care safety and how to solve them but a more fundamental purpose is to reduce liability in the increasingly fertile area of medical malpractice claims. One goal is to check patient medicine by, among other things, finding out what medicines each patient is taking. Another goal is to help patients to be involved with their care by, among other things, telling each patient and his or her family how to report complaints about safety. Still another goal is to identify patient safety risks by, among other things, finding out which patients are most likely to try to kill themselves. Each solution requires a need for live interpretation in location-specific areas where the patient is not fluent in English, typically the native language of the hospital.

While the above highlights the need in centers of medical care, the same situation is also found in any situation where a first responder goes to a location n-specific site and encounters another in need who is not fluent in English.

Another area of liability is privacy. Privacy is said to be the next legal frontier. With the growing use and ease of access to electronic information, numerous laws and regulations exist to impose privacy on many areas including health care and governmental services. Two of the leading standards used to increase privacy are Health Insurance Portability and Accountability Act of 1996 (HIPAA) and Department of Defense (DOD) Security Standards. HIPAA requires that medical information can not be tied to an individual. DOD 5220-22-M has many levels but starts with the premise that an individual not have the easy ability to get the information of other entities. To minimize legal liability by unauthorized access to private information, increasing emphasis must be made to security procedures.

Some Aspects of the Invention

I have invented a system, apparatus and method for addressing the need of remotely providing live interpretation to location-specific sites in a timely manner.

System Aspect

The system for bilingual communication provides remote live interpretation to location-specific sites in a timely manner. The system includes a means to allow a first communicating party and a second communicating party to electronically communicate where the first party and second party communicate in different languages from a group consisting of all spoken languages and sign language. Either or both parties may be more than one person. Communication is made in at least a first location-specific site and is made in a timely manner through a remote third party live interpreter. Several terms have specific meaning that will be discussed further.

As used in this application, "bilingual communication" means communication by electronic means between two parties communicating in different languages from a group consisting of all spoken languages and sign language and communicating in different languages means communication where understanding is comparable to that of fluent communication. This type of communication is beneficial where a second party is not fluent in the language of the first party, and vice versa, and where clear detailed communication is often critical to accomplish a time-sensitive task. One such example is a doctor treating a medical emergency requiring knowledge of medical history. As used in the following discussion the fluent language of the first party will be English and that of the second party will not be English. However, it is understood that the fluent language of the first party may be any from a group consisting of all oral languages and sign language as long as the fluent language of the second party is different.

The terms "first party" and "second party" mean parties associated with roles where each party may be more than one person. The first party may include more than one person and the second party may include more than one person. In a medical care situation, the first party may include several personnel with varying skills needed to care for the second party. In the same context, the second party may include the patient and family members able to provide more information than the patient is able to.

The term "electronic communication means" means communication by internet protocol, satellite communication or radio frequency or a combination thereof.

The term "location-specific site" means the site of a critical activity, of often short notice, where initial movement to another location is restricted for reasons other than to obtain communication through remote live interpreters. Some examples of such sites are an emergency room, the scene of a fire or accident where injuries have occurred, location of a first-responder incident, or a relatively spontaneous business interaction.

The term "timely manner" means the communication between first and second party through a remote interpreter is able to begin in less than one (1) minute from the initial request from first party for bilingual communication. In some embodiments, the communication is able to begin within thirty (30) seconds of the request. In some embodiments the communication is able to begin within five (5) seconds of the request.

The term "remote third party interpreter" means an interpreter who is a live person located in at lease a different room from the first and second party such that the third party must be connected to both the first party and the second party by electronic communication means. In some embodiments, the third party is in a different building. In other embodiments the third party may be in a different municipality, state or even country.

Some embodiments of the system aspect of my bilingual communication invention further comprise communication means able to effect on-demand real time electronic communication through a remote third party while first and second parties are able to move to at least a different location from the first location-specific site. Similar to above, some new terms have specific meanings that will now be discussed further.

The term "on-demand" means that first party is able to electronically identify an available remote third party interpreter in less than five (5) seconds. Some embodiments have a time of less than one (1) second. In other embodiments the time is less than two tenths (0.2) second.

The term "real time" means able to transmit in one language and received in another language with the delay of time that it takes to paraphrase as necessary, where communication delay is able to be less than ten (10) seconds. Some embodiments have a time of less than three (3) second. In other embodiments the time is less than one (1) second.

The phrase "able to move to at least a different location" means the means for communicating to and from another party is portable, confined only by range of transmission and reception of a routing means. Communication means to permit this include means ranging from more substantial devices such as, for example, those in vehicles or on carts to less substantial devices such as, for example, portable communication devices with many functions similar to those of Personal Digital Assistant (PDA) devices and smartphones.

Some embodiments of the system aspect of my bilingual communication invention further comprise communication means able to allow the remote third party to selectively electronically communicate with the first party and second party. In these embodiments the electronic means of the third party is able to be moved to at least a different location while third party communicates with first party and second party. In this manner, the third party is not confined to a specific location before a typical communication means such as, for example, a computer monitor that is currently used by interpreters when performing remote live interpreting services with hearing impaired. Instead, with these embodiments of the invention, a third party interpreter can be available while being in various locations accessible by portable communication devices such as devices similar in some functions to PDA devices and smartphones.

Some embodiments use communication means able to transmit electronic communications among the parties in a secure manner. As used in this application, "securely communicate" means the electronically encrypted communication is through a tunnel at least compliant with HIPPA and DOD standards and transmissions are encrypted and receptions decrypted with at least a 128 bit cipher key. Some embodiments use at least a 256 bit cipher key. Other embodiments use at least a 512 bit cipher key. Still other embodiments use at least a 1024 bit cipher key. The important aspect is to be able to use at least the level of security on electronic transmissions that a situation requires or that is prudent.

I will now discuss several embodiments of the system aspect of my bilingual communication invention in more detail. In addition to medical care scenarios, my invention is beneficial in other situations such as government services involving needs for bilingual services where the time or resources to arrange for interpretation is limited by other factors of an emergency nature. Some of the other situations include, for example, situations involving law enforcement, disaster, military, and business. My discussion of various embodiments will focus on the health care scenarios unless otherwise specifically noted. But it is understood that my invention applies to other situations where timely location-specific translation services by a remote live interpreter are beneficial.

Figure 1:
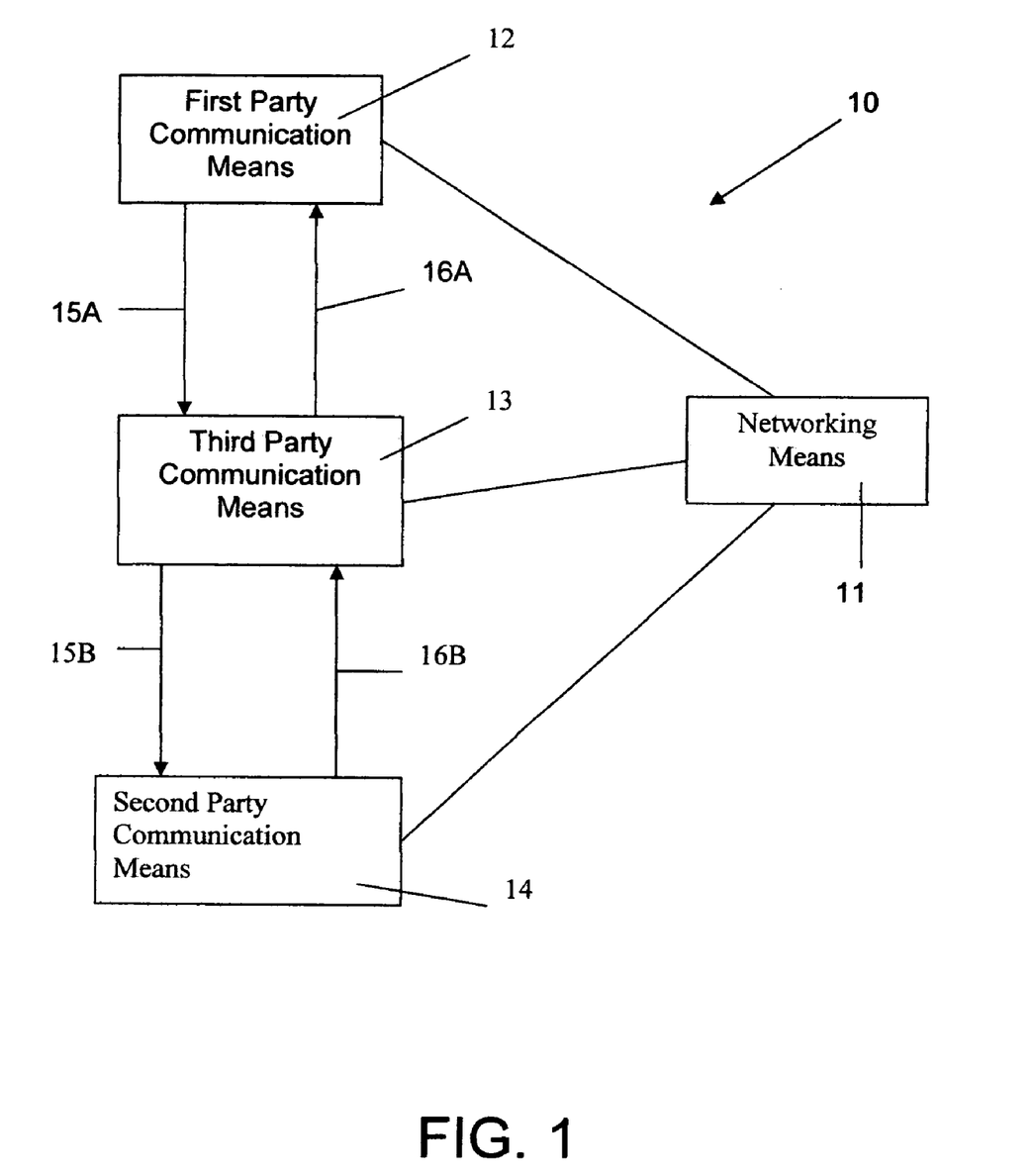
FIG. 1 depicts a flow diagram of an embodiment of the bilingual communication system.

One embodiment of the system is shown in the flow diagram illustrated in FIG. 1. As illustrated, bilingual system (10) includes a networking means (11), a means for a location-specific first party to electronically communicate to the network means (12), a means for a remote live third party interpreter to electronically communicate to the networking means (13), a means for a location-specific second party to electronically communicate to the networking means (14), transmissions from first party to second party (15A, 15B), and transmissions from second party to first party (16A, 16B). In some embodiment, first party means and second party means are in separate devices. In other embodiments, the means are not in separate devices.

In system 10 the three party communication means 12, 13 and 14 are communicatively linked with networking means 11 that establishes connections between first party means 12 and third party means 13, and between second party means 14 and third party means 13. With the system, first party is able to communicate with second party as though they are in a two-way communication party but through the remote third party. Thus the first party speaks into first party communication means 12 and the means electronically sends (15A) the transmission of first party to third party communication means 13. The third party repeats the transmission into third party communication means 13 in the language of the second party as the transmission is received. Communication means 13 electronically sends (15B) the transmission to second party communication means 14 in the language of the second party. The second party responds in a similar manner by transmitting a reply to their communication means 14 in the language of the second party. The transmission is electronically sent (16A) to third party communication means 13, retransmitted by the third party from their means 13 in the language that was transmitted by first party and electronically sent (16B) to first party communication means 12. Each element except transmissions 15A, 15B, 16A, and 16B, will be discussed in more detail below in the form of figures of each element illustrating the function of each element in various embodiments including that shown in FIG. 1.

Figure 2:
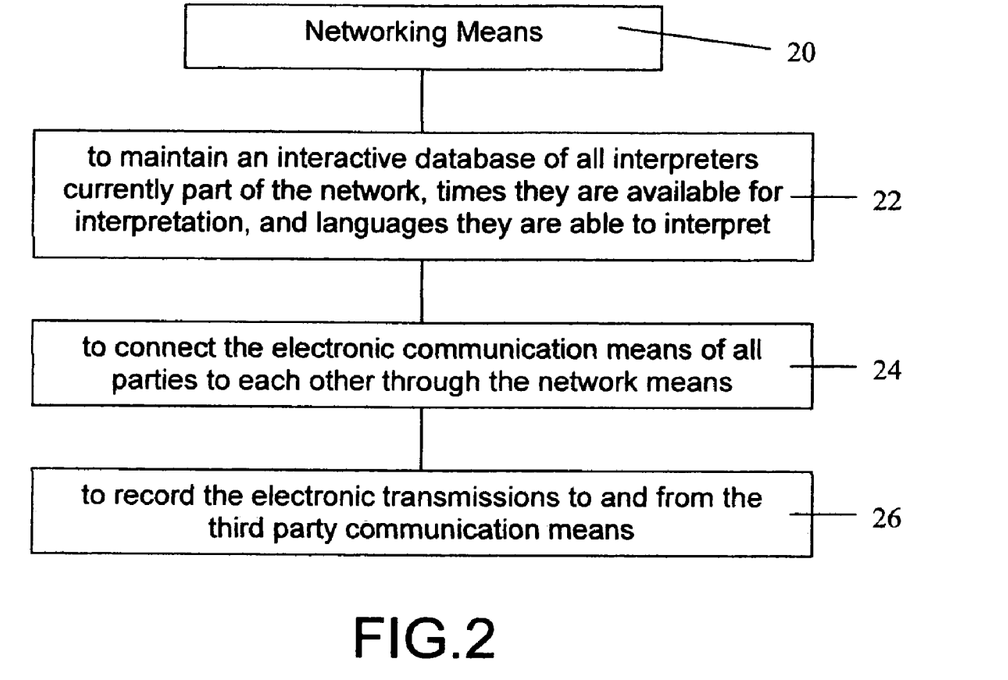
FIG. 2 depicts a functional diagram of one embodiment of a networking means.

FIG. 2 depicts a functional diagram (20) of one embodiment of the networking means that lists at least some functions. One function (22) is to maintain an interactive database of all interpreters currently part of the network, times they are available for interpretation, and languages they are able to interpret. Third party interpreters with access to the networking means would periodically input their availability over a specified amount of time.

Another function (24) is to connect the electronic communication means of all parties to each other through the network means. The networking means is able to direct a request for a third party interpreter in a specified language to the interactive interpreter availability database. There the request is channeled sequentially to three levels as needed. The first level includes interpreters within a locality, the second level to within a region outside the locality and the third level to areas outside that region such as, for example, another country such as India or China where all are available through the network means. The request is first directed to the first level and passes to the second level if no interpreters are found available in the first level. Similarly, if no interpreters are found in the second level, the request is passed to the third level. In recent years, interpreting services available by internet in both India and China have become more available as companies in both countries have become increasingly competitive in internet-accessible interpretation. In this manner, a connection between a first party and a third party is able to be made in a timely manner.

Still another function (26) is to record the electronic transmissions to and from the third party communication means. The recording is archived and maintained as long as a situation requires. Recent medical care laws and regulations suggest that all contact between a medical care person and a patient be recorded to be available for subsequent review by various interested sources. The recording may be used for various reasons including, for example, possible litigation or defense from litigation and governmental sanctions or regulatory review. The recordings are able to be transcribed, independently interpreted, or put to other uses as may be desired. In some situations a recording may not be desirable. In those situations, that feature may be inactive or other embodiments may be used that do not permit such a feature.

The networking means may consist of a server configured to perform the desired functions and routers able to transmit the electronic communications to and from the electronic communications means of the parties and the server. The transmitting of the communication may be on existing internet structures through copper cables, fiber optic cables or other means known to the art. The means of transmitting should be sufficient to transmit video transmissions to convey sign language as one of the languages. One method is to use routers connected by VPN tunnels directed to and from the server or servers configured to perform the desired functions. Other methods of transmitting include, for example, G3 technology that is known to the art and G4 technology that will allow for cellular transported video when it is introduced to the public.

Figure 3:
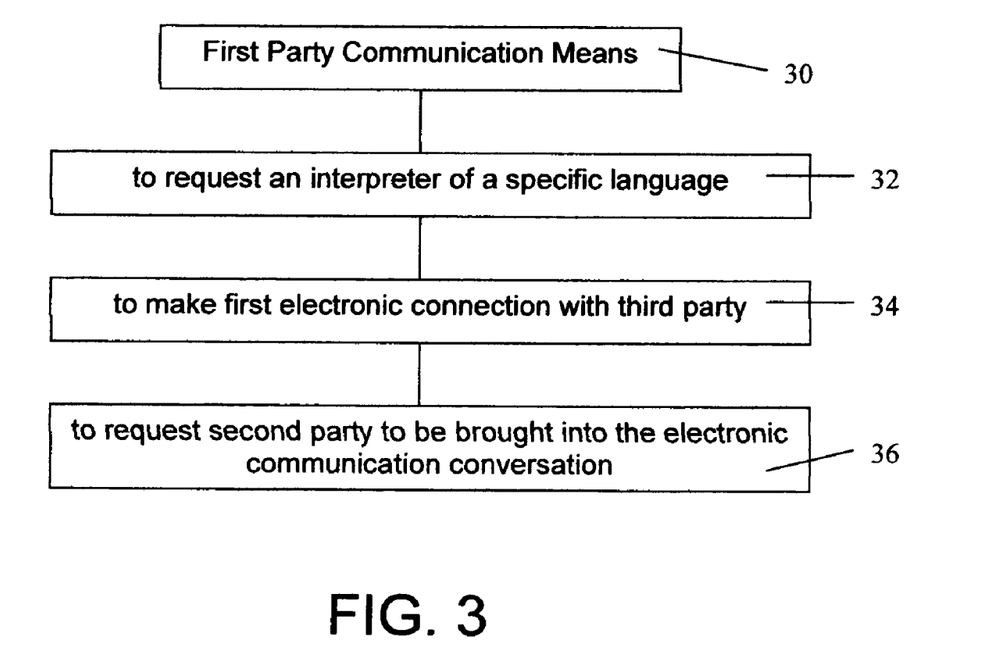
FIG. 3 depicts a functional diagram of one embodiment of a first party electronic communication means.

FIG. 3 depicts a functional diagram (30) of one embodiment of the electronic communication means useable by a location-specific first party to electronically communicate to the network means that lists at least some functions. One function (32) is to request an interpreter of a specific language. By known means, such as, for example, a pull-down list on a touch screen, or a voice-activated language naming means, a language may be selected by the first party. The request is then transmitted to network means 20 where selection is made.

Another function (34) is to make electronic connection with third party. Upon the request, connection occurs in a timely manner as defined earlier since the communication means of the third party that is available is on standby with the network means for the scheduled time.

Still another function (36) is to request second party to be brought into the electronic communication conversation. Upon connection with the communication device of the third party, the first party inputs the identification of the communication device of the second party that is to be added to the conversation. This connection also is in a timely manner. In a similar manner in some situations where additional first party participants are desirable, additional first party communication means may be added to the conversation.

The communication means used by the first party has a means to transmit at least audio communication. Thus, some embodiments have a microphone to pickup audio communication from the first party and at least one ear phone to transmit what the second party communicates through the third party interpreter. Some embodiments have earphones that use the wireless BLUETOOTH® technology, while other embodiments use more conventional earphones attached to the communication means by wires. Still other embodiments use a more traditional speaker means instead of earphone technology.

Figure 4:
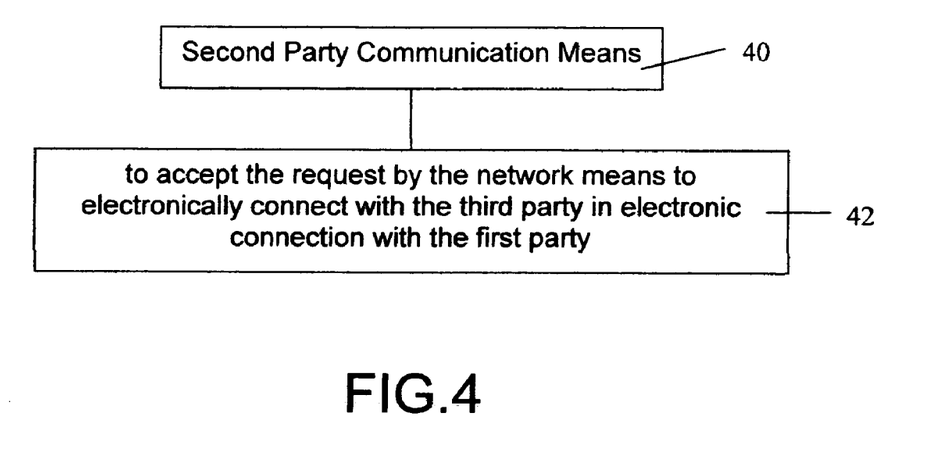
FIG. 4 depicts a functional diagram of one embodiment of a second party electronic communication means.

FIG. 4 depicts a functional diagram (40) of one embodiment of the electronic communication means useable by a location-specific second party to electronically communicate to network means that lists at least one function. That function (42) is to accept the request by the network means to electronically connect with the third party in electronic connection with the first party.

The communication means used by the second party has a means to transmit both video and audio communication. In some embodiments the communication means has (1) a display screen that is able to function as a video monitor and (2) a camera, both to enable sign language communication with the third party interpreter. In other embodiments, the communication means has a microphone to pickup audio communication from the second party and at least one ear phone to transmit what the first party communicates through the third party interpreter. Some embodiments have earphones that use the wireless BLUETOOTH® technology, while other embodiments use more conventional earphones attached to the communication means by wires. Still other embodiments use a speaker means instead of earphone technology. Some embodiments have two earphones in a headset arrangement. Some of these latter embodiments use external sound blocking technology to minimize the distraction of undesirable noises other than the voice of the interpreter. Suppliers of such earphones include, for example, AliphCom Corporation, maker of JAWBONE® headsets with BLUETOOTH® technology.

Unlike what is illustrated in FIG. 1, in some embodiments the communication means used by the first party and the communication means used by the second party is not separate. In some embodiments the communication means is able to be worn by first party with means such as, for example, a lanyard or wire harness. In these embodiments, a microphone and earphone arrangement convey communication from and to the first party as described above, and both a video display and a camera are on the side facing away from the first party to convey communication from and to a second party that may be hearing impaired. In another embodiment the communication means is able to be worn by first party, a microphone and earphone arrangement convey communication from and to the first party as described above, a video display on the side facing the first party is used to indicate where the opposing side is facing, and a camera, a directional speaker and directional microphone are on the side facing away from the first party. In this embodiment, the first party may adjust the position of the communication means to transmit to and receive communication from a selected second party. The last embodiment, or reasonable and obvious variations thereof, is particularly useful in situations not involving medical care where timely clear communication is desired from a location-specific site through a remote third party interpreter.

To enable the communication devices of first party and second party to be able to move to different locations while interpretive communication is underway, the means may use communication technology able to transmit at least video sign language without wires. One means of doing this is by using WI-FI® technology that is picked up by a router configured to receive from and transmit to the communication means and is communicatively connected to the network means. Some embodiments use WI-FI® G technology and some use WI-FI® N technology. Other technologies may also be used as long as they are able to convey video sign language sufficiently well to allow hearing impaired who are fluent in sign language to communicate.

Figure 5:
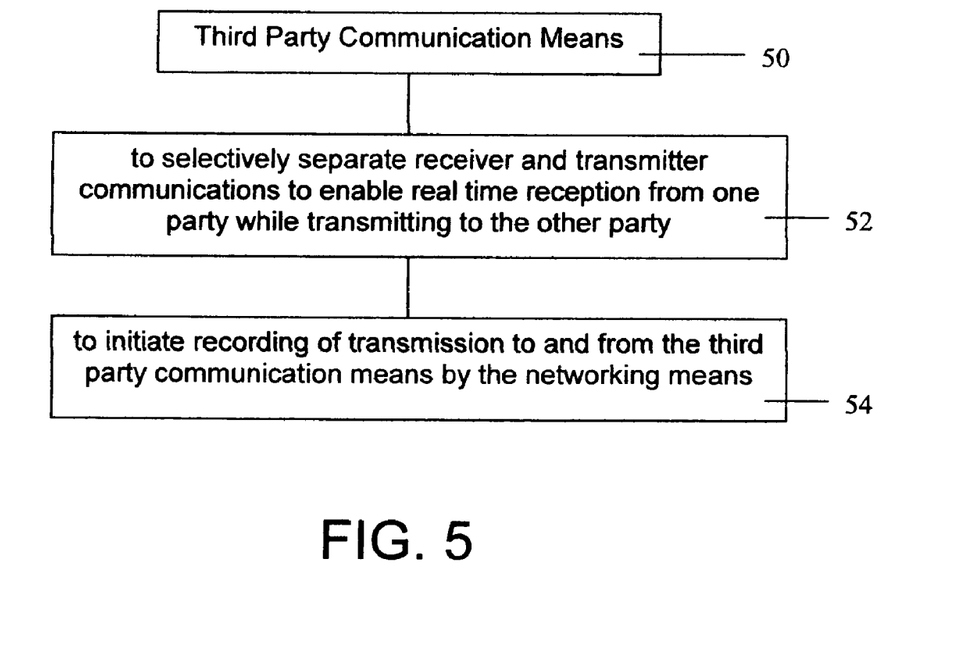
FIG. 5 depicts a functional diagram of one embodiment of a third party electronic communication means.

FIG. 5 depicts a functional diagram (50) of one embodiment of the means for an electronic communication means for a remote third party to electronically communicate to network means that lists at least some functions. One function (52) is a means able to selectively separate received and transmitted communications to enable real time reception from one party while transmitting to the other party. One example of such a means is a half-duplex system used in the telecommunication industry to provide communication in both directions but in only direction at a time (not simultaneously). Thus, the communication means of the third party would allow the third party in a first communication mode to hear from the first party while sending the translation to the second party. Then by switching to a second communication mode, the third party interpreter would hear from the second party while sending the translation to the first party.

Another function (54) is a means able to initiate recording of transmission to and from the third party communication means by the networking means. As mentioned above, recording of the transmissions to and from the remote third party interpreter may be highly desirable as well as required in some situations. The communication means used by the third party is configured to allow the third party to record an interpreting session.

Other functions that the communicating means may have that are not listed in FIG. 5 may be (1) a means to record the time duration of the interpreting session and (2) means to use the communication means as a cell phone when not used in interpreting sessions. The first function is useful as a way to submit charges for the interpretation is a more accurate and timely fashion. The second function is a way for remote third party interpreters to be encouraged to carry their communication means with them when the means is portable like means similar to a PDA or smartphone with some customized functionality.

Apparatus Aspect

In addition, I have invented a bilingual communication apparatus that is very useful to users of the bilingual interpreting industry by providing remote live interpretation to location-specific sites in a timely manner. Some embodiments of the apparatus are extremely mobile, clear, fast and secure. Clear communication is obtained by innovative use of WI-FI®, BLUETOOTH®, and cellular communication by both voice and video over IP. Fast communication is obtained because interpreters can use half-duplex mode systems to permit conversations between first party and second party through a remote interpreter to be as seamless as if they were talking back and forth with just themselves. Thus, at any given moment, the person the interpreter listens to is not the person that the interpreter talks to. Secure communication is achieved through encrypted communication with very high bit encryption ciphers, through VPN VOIP connections, allowing at least first and second parties to be mobile.

Some embodiments have Global Positioning System (GPS) capability. Such function allows for a networking means to preferentially select third party interpreters that may be located closer to the location-specific site. Such function also allows for possible location of an apparatus that is lost.

The apparatus includes a supporting structure having a top and a bottom, a communication means at least partially enclosed by the structure, a visual communication means and an audio communication means. The communication means is configured to be able to allow at least one communicating party to electronically connect with a networking means that is configured to be able to communicatively connect to at least two other parties to perform bilingual communication in a timely manner between a first party and a second party through a remote third live interpreting party. The first party and second party (1) are in a first location-specific site and (2) communicate in a different language from a group consisting of all spoken languages and sign language, and the third party is able to communicate in both languages. The visual communication means is able to convey at least language selection to the networking means and sign language to and from a party. The audio communication means is able to convey audio communication to and from a communicating party. In addition, the apparatus is able to be moved from the first location-specific site while electronic communication is continued among parties. Some features may not be operative depending on the party using the apparatus.

The supporting structure is intended to contain the electronic parts of the apparatus in a protective manner. Protection should be sufficient to protect the device form hazards commonly encountered in location-specific sites. Some of these hazards include, for example, dropping it on a hard surface, exposing it to fluids such as, for example, water, and contacting it with particulate debris such as, for example, dirt and dust. The material of the structure may be of any durable material and includes materials such as, for example, plastic, rubber and metal or combinations thereof. Additional coverings materials may be employed to augment protection such as, for example, elastomeric skins or water-resistant coatings. Some embodiments have structures that are tough and break-resistant such as structures made at least in part from materials such as, for example, carbon fiber composites.

The communication means is a means configured to be able to perform the functions listed above if they are activated. For example, the first party communication means must be able to select a language that needs interpreting and to access the networking means to initiate bilingual communication while the second party communication means does not need these capabilities. The communication means is similar to what is available today in the form of that used in PDAs or smartphones except it is configured to at least connect with a networking means configured to perform the functions listed above. It is also configured to allow communicating parties to perform their desired activities associated with bilingual communication in a timely manner between two parties in a location-specific site speaking different languages through a remote third party interpreter.

The video communication means comprises a video display means and a video image receiving means. The video display should have sufficient image resolution and image size to enable a hearing-impaired communicating party to see the sign language communication from the third party live interpreter when placed so the hearing-impaired party can sign. The video display also is able to display menu options that may include, for example, a list of languages and indicators to activate or un-activate a recording feature, adjust audio volume, lock or unlock access to network means, switch camera on or off, and switch BLUETOOTH® on or off. Some embodiments have a diagonal dimension of at least 2.8 inches (7.1 millimeters (mm)). Other embodiments have a diagonal dimension of at least 3.4 inches (8.6 mm). Some embodiments have interactive screens such as, for example, those that are activated by touch and those that are activated by the click of a mouse. In addition, some embodiments also comprise a projection means (not shown) that is able to project an image onto a viewing surface.

The video image receiving means is a means able to receive an image of sufficient resolution to be able to allow the communication means to electronically communicate sign language to a remote third party interpreter in sufficient clarity to be understood by the third party. Some video imaging receiving means are self-focusing while others may have focusing adjusted through other means such as, for example, through the video display means touch screen access of a menu to control resolution. Video imaging receiving means can be, for example, cameras readily available in many PDAs, smartphones and camera cell phones, all in the marketplace today.

The audio communication means comprise an audio transmitting means and an audio receiving means. The audio transmitting means is able to send audio communications from a party's apparatus to a party in a clear and intelligible manner. Some audio transmitting means are able to broadcast the transmission into an area. Such means include, for example, at least one speaker. Some speakers are able to transmit audio communication a relatively short distance such as, for example, less than the distance from a person's ear to that person's hand when that person holds the apparatus. Such means are typical for speakers used in devices that include, for example, portable radios or alarm clocks. Other audio transmitting means are able to selectively send the transmission to a particular party while that party is able to hear other sounds. Such means include, for example, ear pieces connected to the apparatus by a wire such as, for example, standard ear pieces readily available in department stores and wireless earpieces such as, for example, those using BLUETOOTH® technology. Still other audio transmitting means are able to selectively send the transmission to a particular party in a manner that minimizes other distracting sounds. Such means include, for example, headsets connected to the apparatus by a wire such as, for example, some Bose® speakers and wireless headsets such as, for example, JAWBONE® headsets with BLUETOOTH® technology.

The audio receiving means is able to receive audio transmissions from a party in a clear and intelligible manner. Some audio transmission means may be able to pick up audio communication from a relatively short range such as less than the distance from a person's mouth to that person's hand when that person holds the apparatus. Such means include, for example, microphones that are commonly used with Dictaphones or computers that have real-time voice messaging service capability.

In some audio communication means, the means are able to selectively receive from one party while transmitting to another party and vise versa by means of a switching means. Such means include, for example, a half-duplex mode of communication such as that used by two walkie-talkies, each in communication with a different party.

In some communication means, the sensitivity of the audio transmitting and audio receiving means may be altered either selectively or in combination. Such volume control may be accomplished by such means as, for example, a touch screen menu option on the video display means or a physical dialing means.

Figure 6:
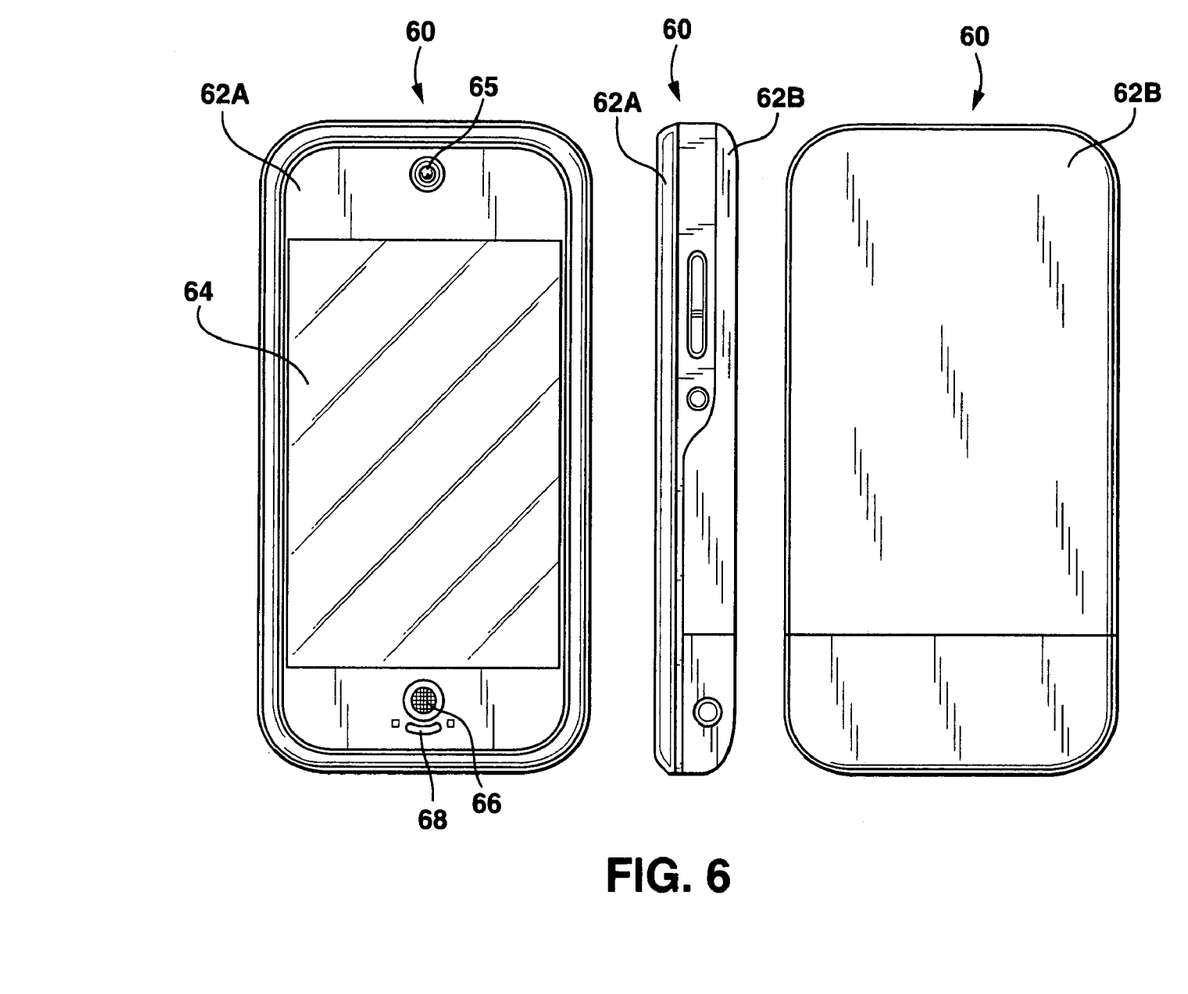
FIG. 6 illustrates a front view, side view, and back view of an embodiment of an apparatus used by one party.

One embodiment of the apparatus is illustrated in FIG. 6 by a front view, a side view, and a rear view of an embodiment that is suitable for use by one communicating party. The apparatus is a portable device (60) that comprises a supporting structure (62A, 62B), a communication means at least partially enclosed by the structure (not seen), a video display means (64), a video image receiving means (65), an audio transmitting means (66) and a audio receiving means (68).

In some embodiments the structure of the apparatus for the communicating means of the first party also contains the communicating means for the second party. Such situations may arise when a second party is hearing impaired, or in a situation where the first party desires to maintain physical control of the communication means for both first party and the second party. When bilingual communication is desired with a second-party who is hearing impaired, the single unit may be similar to that discussed above, an embodiment of which is illustrated in FIG. 6, and variations thereof. The first party may access the networking means through the video communication means. Then the first party may switch the video communication means to function as that of the second party and reverse the apparatus so that the video display mean and the video image receiving means are facing the second party during the following bilingual communication. In other embodiments, the communication means of the second party may comprises a second video display means and video image receiving means on the opposite side of the first video display means and image receiving means to enable first party to access the menu of the networking means while the second party is communicating with the third party live interpreter. In some embodiments the first video image receiving means is optional.

In situations where the first party desires to maintain control of the communication means for both first party and second party, some embodiments have additional changes to the video communication means and audio communications means over those discussed above. The video display means may be a dual arrangement discussed in the preceding paragraph. However, the video display facing the first party may also be used to target the second party that the first party desires to talk with through interaction with a second video image receiving means that can be aimed at the desired second party. Also, the audio transmitting means may also include at least one additional audio transmitting means that is able to transmit audio communication in a directional manner from some distance such as, for example, up to several yards (meters) or more. Such means include directional speakers that are well known to the communication industry. In addition, the audio receiving means includes at least one additional audio receiving means able to pick up audio communication from some distance such as, for example, up to several yards (meters) or more. Such means include directional microphones that are well known to the communication industry. Both directional means may be communicatively linked to the targeting means used by the first party.

Figure 7:
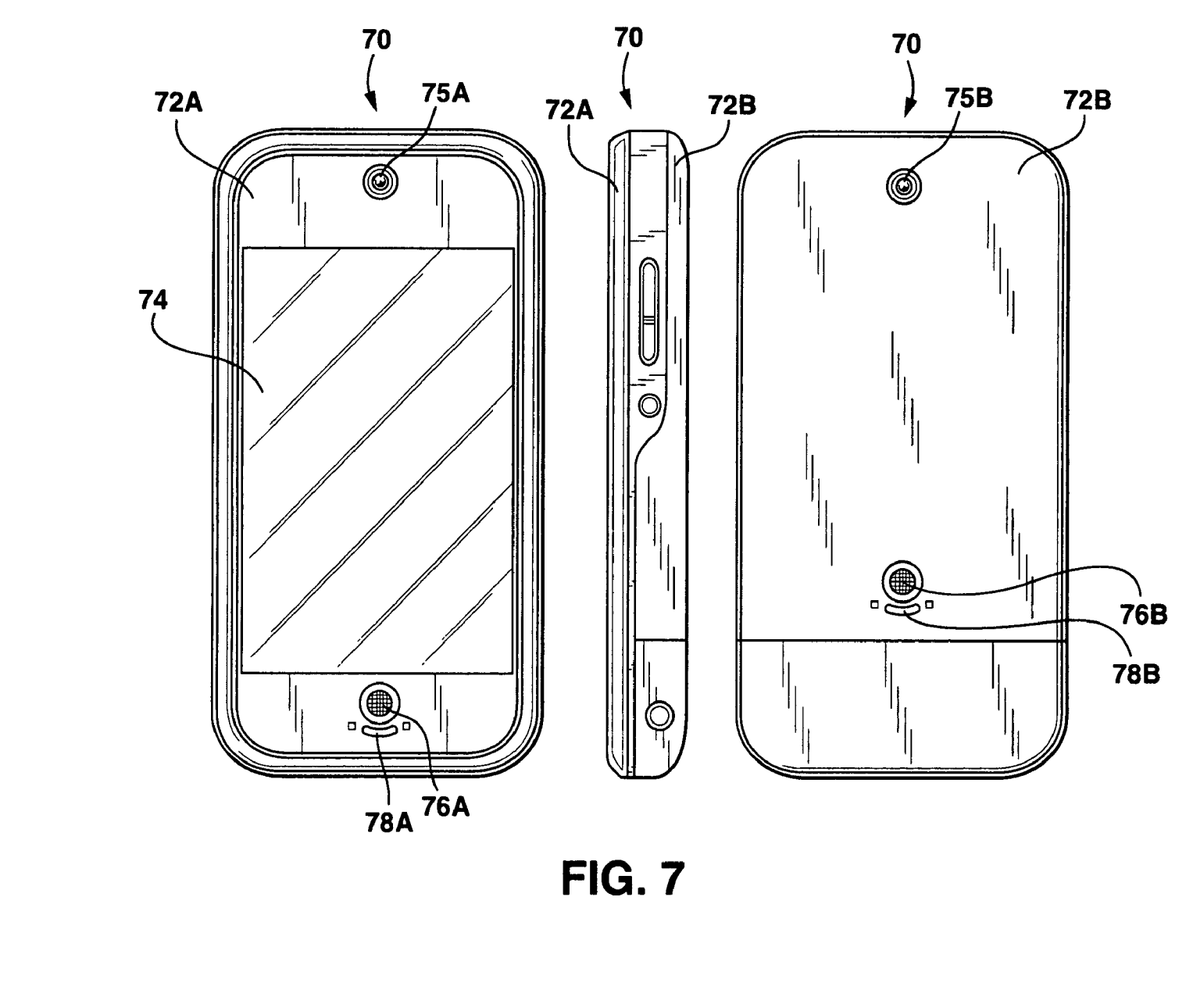
FIG. 7 illustrates a front view, side view, and back view of an embodiment of an apparatus used by a first party and a second party.

One such embodiment of the apparatus is illustrated in FIG. 7 by a front view, a side view, and a rear view of the embodiment that is suitable for use by both a first and a second communicating party. The apparatus is a portable device (70) that comprises a supporting structure (72A, 72B), a communication means at least partially enclosed by the structure (not seen), a video display means (74), two video image receiving means (75A, 75B), two audio transmitting means (76A, 76B) and two audio receiving means (78A, 78B). 76B and 78B are directional.

Method Aspect

I have also invented a method of bilingual communication to provide remote live interpretation to location-specific sites in a timely manner. Unlike any other interpretive system currently known, this method simulates two-way conversation between two parties speaking different languages from a group consisting of all oral languages and sign language. In addition, it allows such conversation to occur in location-specific sites and in a secure manner.

The method includes the following steps. One step is to provide a means to allow a first communicating party and second communicating party to electronically communicate from a first location-specific site in a timely manner through a remote third party interpreter, where first party and second party communicate in different languages from a group consisting of all spoken languages and sign language The means used by the first and second party is able to be moved to different locations during communication and the first party and the second party may each include more than one persons. Another step is to select a language that is in need of interpretation. Another step is to connect with the third party in a timely manner. Still another step is to connect a second party to the third party. Another step is to begin a conversation between first party and second party that flows similar to a two-way conversation in real time with each party receiving communication in his or her own language from the remote third party.

Embodiments of this method include providing systems previously described under System Aspects. It is understood that system elements that are not specifically mentioned but accomplish the same functions as those previously described are included in the providing step.

Selecting a language is a step made by the first party. It involves the first party using the communication means of the first party to access a networking means to request interpretation form a third patty interpreter who is part of the network and is available. Various means may be used such as, for example, using a pull down menu on a video display touch screen and touching the language of interest and accessing a menu by voice commands similar to those used in some cell phones to call a telephone number.

Electronically connecting with a remote live third party occurs in a timely manner. The network is configured to search the list of scheduled third party interpreters that is on file in some sequence such as, for example, nearness to the location-specific site and length of time that an interpreter is available.

Connecting the communication means of the second party with the third party occurs after the first party and the third party are connected. This step may occur in different ways. In some embodiments of this method, the first party and second party may be electronically connected first such that when the first party connects with the third party, the second party is also connected with the third party. Such as situation can occur, for example, when the communication means for the first party and the second party are located in the same apparatus or when the first party electronically connects the second party before the first party is connected to a third party, typically before the first party selects a language. In other embodiments of this method, the first party may request that a second party communicating means be connected to that of a third party that is in electronic communication connection with the first party. Such additional connection may be done by, for example, activating a connect function on a menu of the communicating means of the first party and entering the identification of the second party communicating means that the first party desires to be connected to the third party communicating means.

Beginning of the conversation can now commence. The conversation is conversation between first party and second party that flows similar to that of a two-way conversation in real time with each party receiving communication in the language of that party. However it is not a two-way conversation between any two parties. Instead, the first party speaks as though to the second party but actually, in electronic fashion, to a remote third party interpreter and electronically hears what the second party is saying or signing as though from the second party but from the remote third party interpreter. Similarly, the second party speaks or signs as though to the first party but actually, in electronic fashion, to a remote third party interpreter and electronically hears what the second party is saying or sees what the third party interpreter is signing, as though from the first party but from the remote third party interpreter. In some embodiments of the method, the second party is able to communicate with a minimum of distracting noise through use of audio receivers that dampen external noise, such as, for example, by means of JAW-BONE® headsets.

In other embodiments of the method, a recording of all transmissions between first and third parties and second and third parties may be made. This recording step is typically initiated by the third party but may, in some embodiments, be initiated by the first party.

Other modifications and changes regarding the system, apparatus, and method aspects of my invention will be apparent to those skilled in the art. The invention is not considered limited to the embodiments chosen for purposes of disclosure and covers all changes and modifications which do not constitute departures from the true spirit and scope of this invention.

I claim:

1. A system for bilingual communication between a first party and a second party through a remote live interpreter, comprising:

a portable device for the first party communicating in a first language at a location-specific site comprising a microphone, an ear phone for the first party, a display screen, and a camera, wherein the portable device is configured to transmit via an internet network a request for a live interpreter of a selected different language to a network server that maintains a database of interpreters and languages able to be interpreted by interpreters, wherein the portable device for the first party receives user input indicative of identification of a communication device for a second party communicating in the selected different language at the location-specific site with the first party, wherein the portable device receives a second party communication in the selected different language from the communication device for the second party; and wherein, in response to the request for the live interpreter of the selected different language, the portable device establishes a connection via the internet network with a third party communication device for the remote live interpreter at a remote site and in communication with the network server, wherein the portable device transmits to the third party communication device a first party communication in the first language from the first party and the second party communication in the selected different language from the second party, and wherein the portable device is configured to transmit to the third party communication device an encrypted transmission of the second party communication in the selected different language and to receive from the third party communication device an encrypted transmission of the second party communication in the first language for output at the ear phone for the first party.

2. The system of claim 1, wherein the portable device is configured to transmit to the third party communication device an encrypted transmission of the first party communication in the first language and to receive from the third party communication device an encrypted transmission of the first party communication in the selected different language for output at the communication device of the second party.

3. The system of claim 2, wherein the portable device establishes the connection via the internet network with the third party communication device that is configured to record the time duration of an interpreting session including the first party communication and the second party communication.

4. The system of claim 1, wherein the portable device transmits the request for the live interpreter in response to user input of the selected different language that is selected from a list of languages displayed on the display screen of the portable device.

5. The system of claim 1, wherein the ear phone for the first party comprises a wireless earpiece.

6. The system of claim 1, wherein the communication device for the second party at the location-specific site comprises a microphone and at least one earphone.

7. The system of claim 6, wherein the ear phone of the communication device for the second party at the location-specific site comprises a wireless earpiece.

8. The system of claim 1, wherein the portable device establishes the connection via the internet network with the third party communication device that is configured to selectively separate received and transmitted communications and provide communication in both direction but only in one direction at a time.

9. The system of claim 1, wherein the portable device establishes the connection via the internet network with the third party communication device that is configured to record the transmissions to and from the remote live interpreter.

10. The system of claim 1, wherein the portable device establishes the connection via the internet network with the third party communication device that is portable such that the remote live interpreter carries the third party communication device.

11. The system of claim 1, wherein the third party communication device is in communication with the network server when the third party communication device is available on standby with the network server for a scheduled time.

12. The system of claim 1, wherein the network server maintains the database as an interactive interpreter availability database that is accessible by third party interpreters to input availability over an amount of time.

13. The system of claim 1, wherein the first language of the first party and the selected different language of the second party are both selected from a group consisting of all spoken languages and sign language.

14. A method of using the system of claim 1, comprising:
receiving user input of a selection of language from a list on the display screen of the portable device;
electronically connecting the portable device for the first party at the location-specific site with the third party communication device of the remote live interpreter at the remote site in a timely manner;
and
beginning a communication between the first party and the second party that flows similar to a two-way conversation in real time with each party receiving communication in the respective language of that party.

* * * * *